United States Patent Office 3,297,596
Patented Jan. 10, 1967

3,297,596
POLYURETHANES CONTAINING ADDUCTS OF HEXAHALOCYCLOPENTADIENE
Francis M. Kujawa, Tonawanda, N.Y., and Michael Worsley, Edmonton, Alberta, Canada, assignors to Hooker Chemical Corporation, Niagara Falls, N.Y., a corporation of New York
No Drawing. Filed Sept. 20, 1965, Ser. No. 488,716
17 Claims. (Cl. 260—2.5)

This is a continuation-in-part of copending application Serial Number 114,041, filed June 1, 1961, now abandoned.

This invention relates to novel resinous compositions useful in the preparation of polyurethane compositions. In another aspect, the invention relates to processes for producing such resins. A further aspect of the invention relates to the novel polyurethane compositions containing such resins.

The resinous compositions of the present invention are useful in the preparation of highly fire-resistant foamed or cellular plastic products. The resinous compositions of the invention are further useful in the preparation of adhesives, binders, laminates, coatings and potting compounds.

The polyurethan foams have found wide and varied use in industry. For instance, they can be used as core materials between skins of many and varied compositions. In aircraft construction, the foam can be enclosed between aluminum or fiber glass reinforced plastic skins to form an assembly which is rigid, strong and yet remarkably light. Because of their excellent electrical properties, polyurethane foams enclosed by fiber glass reinforced plastic skins have also found use in the construction of radomes. The polyurethane foams have another useful property; they develop a high degree of adhesion during the foaming process. As a result they will adhere to skins composed of such varied materials as metals, plastics, ceramics and glass. The resulting sandwich-type assemblies lend themselves well for use in such diverse fields as in the construction and insulation industries.

The rigid plastic foams can also be untilized without skins as insulating materials for hot water or steam pipes and valves. Their utility for such applications is enhanced by their ability to be applied, foamed and used in situ.

The rigid plastic foams have many desirable properties. They have great structural strength coupled with low density. In sandwich-type constructions, they exhibit a high degree of rigidity, a property particularly desirable for building purposes. They are excellent vibration dampers and can thus support highly resonant loads. Because of their fine cell structure they are excellent heat and sound insulators. The foam cells can be made very fine and uniform, so that the cells are tough and nonbrittle and hence, highly resistant to rupturing Many of the polyurethane compositions and foams of the prior art have the disadvantage of being flammable. This disadvantage prevents the use of these materials in many applications. This problem is overcome by the compositions disclosed and claimed in United States Patent 3,156,659 and in abandoned application Ser. No. 764,772, filed October 2, 1958. In accordance with the patent, fire resistance is imparted to polyurethane compositions by incorporating therein alkyd resins comprising the reaction product of an adduct of hexahalocyclopentadiene and unsaturated polycarboxylic compound and a polyhydric alcohol. The aforesaid application relates to the use of alkyd resins that are the reaction products of polyhydric alcohol adducts of hexahalocyclopentadiene and polycarboxylic compounds. The mechanical handling of the aforesaid compositions has not been entirely satisfactory in all applications because the incorporation of halogen-containing compounds into the alkyd resins causes an increase in viscosity of the compositions. When the halogen content is greater than about fifteen percent, solid alkyds can result. Such solid alkyd resins are difficult to handle for the production of polyurethane foams, adhesives, coatings and the like. It has been previously found that plasticizers can be advantageously added to such solid alkyds to lower their viscosity and permit easier handling. However, such materials plasticize the finished compositions and adversely affect the physical properties of the end products.

Moreover, these viscosity effects have an adverse influence on the course of the polyesterification process itself. Because the viscosity of the reaction mass increases as the course of the esterification reaction progresses, the required reaction time for lowering the acid number of the resinous polyester product becomes excessive. Generally, the last fifteen percent of the reaction normally consumes about fifty percent of the total cycle time.

Accordingly, it is an object of the invention to provide a process for reducing the viscosity of alkyd resins containing adducts of hexahalocyclopentadiene.

It is another object of the invention to provide an improved process for producing alkyd resins containing adducts of hexahalocyclopentadiene It is still another object of the invention to provide novel halogen-containing, fire retardant alkyd resins useful in the preparation of polyurethane compositions.

It is a further object of the invention to provide novel polyurethane compositions that can be useful in the production of foams, adhesives, binders, laminates, coatings and potting compounds.

These and other objects are accomplished by providing a resin product of components comprising a monomeric 1,2-epoxide, and a resinous polyester having an acid number in the range of twenty to about ninety and selected from the group consisting of (1) the reaction product of components comprising an adduct of hexahalocyclopentadiene and a polycarboxylic compound containing aliphatic carbon-to-carbon unsaturation and a polyhydric alcohol containing at least three hydroxyl groups, (2) the reaction product of components comprising an adduct of hexahalocyclopentadiene and a polyhydric alcohol containing aliphatic carbon-to-carbon unsaturation, a polyhydric alcohol containing at least three hydroxyl groups and a polycarboxylic compound, (3) the reaction product of components comprising an adduct of hexahalocyclopentadiene and a polyhydric alcohol containing aliphatic carbon-to-carbon unsaturation and a polycarboxylic compound containing at least three carboxyl groups, and (4) mixtures thereof, wherein the halo-substituent is selected from the group consisting of fluorine, chlorine, bromine and mixtures thereof. The acid number of the resin product is less than twenty. In another aspect, the invention provides for reacting such a resin product with an organic polyisocyanate to provide novel isocyanato-terminated, resinous products useful in the preparation of polyurethane compositions. In another aspect, the invention provides for reacting the resin product with an organic polyisocyanate to provide novel polyurethane compositions. In a further aspect of the invention, novel polyurethane foams are provided by incorporating a foaming agent in the polyurethane compositions.

The highly halogenated resin products of this invention have greatly reduced viscosities compared to such alkyd resins that have been known heretofore. This property these resins to be processed readily in the production of polyurethane compositions without resorting to special mixing devices, elevated temperatures or additives that have a detrimental effect on the compositions. Moreover, during the production of the resins of the invention, it is possible to maintain the viscosities of the reaction mixture at reasonable levels with the result that the required reaction time for producing low acid number products is greatly reduced. In a typical example, an alkyd resin produced in accordance with Patent No. 3,156,659 required a reaction time of approximately thirty hours to reach an acid number of eight, and the resulting resin had a Gardner viscosity of thirty-five seconds at 120 degrees centigrade. Operating in accordance with the invention, it was possible to reduce the reaction time to approximately eighteen hours and the resulting resin has a Gardner viscosity of four to six seconds at 120 degrees centigrade. Thus, by virtue of its monoepoxide component, the resin product of the invention has a viscosity as measured in Gardner seconds at 120 degrees centigrade that is lower than the viscosity as measured in Gardner seconds at 120 degrees centigrade of the corresponding resinous polyester that is unmodified by a monoexopide component, but which resinous polyester has the same acid number and the same caboxylic and polyhydric alcohol components employed in the same ratio as does the resin product of the invention. These and other advantages will be shown in greater detail in the specific examples presented hereinafter.

Among the adducts of hexalocyclopentadiene and polycarboxylic compounds which can be used in the preparation of the products of this invention are:

1,4,5,6,7,7-hexachlorobicyclo-(2.2.1)-5-heptene-2,3-dicarboxylic acid;
1,4,5,6,7,7-hexabromobicyclo-(2.2.1)-5-heptene-2,3-dicarboxylic acid;
1,4,5,6,7,7-hexachlorobicyclo-(2.2.1)-5-heptene-2,3-dicarboxylic anhydride;
1,4,5,6,7,7-hexachloro-2-methylbicyclo-(2.2.1)-5-heptene-2,3-dicarboxylic anhydride;
1,4,5,6-tetrachloro-7,7-difluorobicyclo-(2.2.1)-5-heptene-2,3-dicarboxylic acid;
1,4,5,6,7,7-hexachlorobicyclo-(2.2.1)-5-heptene-2-acetic-2-carboxylic anhydride;
5,6,7,8,9,9-hexachloro-1,2,3,4,4a,5,8,8a-octahydro-5,8-methano-2,3-naphthalene dicarboxylic acid and anhydride; and
1,2,3,4,5,6,7,7-octachloro-3,6-methano-1,2,3,6-tetrahydrophthalic acid and anhydride.

The acids and anhydrides are the preferred polycarboxylic compounds. Mixtures of these can be employed.

Among the adducts of hexahalocyclopentadiene and polyhydric alcohols which can be used in the preparation of the products of this invention are:

2,3-dimethylol-1,4,5,6,7,7-hexachlorobicyclo-(2.2.1)-5-heptene;
1,4,5,6,7,7-hexachloro-2,3-bishydroxymethylbicyclo-(2.2.1)-2,5-heptadiene;
3-(1,4,5,6,7,7-hexachlorobicyclo-(2.2.1)-5-heptene-2-yl)methoxy-1,2-propanediol;
2,3-dimethylol-1,4,5,6-tetrachloro-7,7-difluorobicyclo-(2.2.1)-5-heptene;
2,3-dimethylol-1,4,5,6,7,7-hexabromobicyclo-(2.2.1)-5-heptene;
3-(1,4,5,6-tetrachloro-7,7-difluorobicyclo-(2.2.1)-5-heptene-2-yl)methoxy-1,2-propanediol.

These compounds and the method of preparation are disclosed in United States Patent 3,007,958.

It is generally desirable, especially in rigid or semi-rigid foams, that at least a portion of the total polyhydric alcohol component have at least three hydroxyl groups per molecule to provide a method for branching the resin; however, the ratio of dihydric alcohol to trihydric alcohol can be varied depending on the amount of branching desired. The polyhydric alcohols can be aliphatic, cyclo-aliphatic, heterocyclic or aromatic and can be saturated or unsaturated. The alcohol can contain one or more dissimilar atoms between carbon atoms in the molecule, such as oxygen, sulfur, and the like. They can also be substituted with noninterfering substituents, such as halogen atoms, ester radicals, and the like. Illustrative polyhydric alcohols include the following: glycerol; polyglycerol; pentaerythritol; polypentaerythritol; mannitol; sorbitol; methyltrimethylolmethane; 1,4,6-octanetriol; butanediol; pentanediol; hexanediol; dodecanediol; octanediol; chloropentanediol; glycerol allyl ether; glycerol monoethyl ether; triethylene glycol; 2-ethylhexanediol-1,4; 3,3'-thiodipropanol; 4,4'-sulfonyldihexanol; 3,5-dithiahexanediol-1,6; 3,6-dithiaoctanediol-1,8; cyclohexanediol-1,4; 1,2,6-hexanetriol; 1,3,5-hexanetriol; polyallyl alcohol; trimethylol ethane; trimethylol propane; 1,3-bis(2-hydroxyethoxy)propane; 5,5'-dihydroxydiamyl ether; tetrahydrofuran - 2,5 - dipropanol; tetrahydrofuran - 2,5-dipentanol; 2,5-dihydroxytetrahydrofuran; tetrahydrothiophene-2,5-dipropanol; tetrahydropyrrole-2,5-propanol; 4 - hydroxy - 3 - hydroxytetrahydropyran; 2,5 - dihydroxy-3,4-dihydro-1,2-pyran; 4,4'-sulfinyldipropanol; 2,2-bis(4-hydroxyphenyl)propane; 2,2'-bis(4-hydroxyphenyl)methane; and the like. Preferred polyols are the open-chain aliphatic polyhydric alcohols and polyalkylene ether polyols possessing from two to six esterifiable hydroxyl groups and containing no more than twenty carbon atoms.

The polycarboxylic compounds useful in the practice of the invention can be aliphatic, cycloaliphatic, aromatic or heterocyclic and can be saturated or unsaturated. The term "polycarboxylic compound" when used in discussing the novel resins of this invention is intended to include the acids, the acid anhydrides and mixtures thereof. Illustrative polycarboxylic compounds include the following: phthalic acid; isophthalic acid; terephthalic acid; maleic acid; tetrachlorophthalic acid; dodecylmaleic acid; octadecenylmaleic acid; fumaric acid; aconitic acid; itaconic acid; 3,3'-thiodipropionic acid; 4,4'-sulfonyldihexanoic acid; 3-octenedioic-1,7 acid; 3-methyl-3-decenedioic acid; succinic acid; adipic acid; 1,4-cyclohexadiene-1,2-dicarboxylic acid; 3-methyl-3,5-cyclohexadiene-1,2-dicarboxylic acid; 3-chloro-3,5-cyclohexadiene-1,2-dicarboxylic acid; 8,12-eicosadienedioic acid; 8-vinyl-10-octadecenedioic acid, and the corresponding acid anhydrides such as phthalic anhydride. Preferred polycarboxylic compounds are the aliphatic and cycloaliphatic dicarboxylic acids containing no more than fourteen carbon atoms and the aromatic dicarboxylic acids containing no more than fourteen carbon atoms.

Suitable tricarboxylic compounds that can be used in the practice of the invention are trimellitic acid and anhydride and tricarballylic acid and anhydride.

Where aromatic or bicyclo carboxylic compounds are used, it is sometimes desirable to incorporate aliphatic acids as part of the resin. Adipic acid is generally preferred for this purpose, although other suitable acids may be used such as oxalic, malonic, succinic, glutaric, pimelic, suberic, azelaic, and the like. Unsaturated acids such as maleic, fumaric, itaconic, citraconic, aconitic, and the like, can also be used.

Monomeric epoxides are generally preferred in the practice of the invention. Especially desirable are the monomeric 1,2-epoxides, i.e., epoxides containing the structure

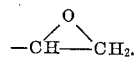

Examples of monoepoxides that can be employed in the practice of the invention are ethylene oxide, propylene oxide, butylene oxide, isobutylene oxide, cyclohexene oxide, 2,3-epoxyhexane, 3-ethyl-2,3-epoxyoctane, epichlorohydrin, epibromohydrin, styrene oxide, glycidol, decylene oxide, triphenyl glycidyl silane, allyl glycidyl ether, methyl glycidyl ether, phenyl glycidyl ether, butyl glycidyl sulfide, glycidyl methyl sulfone, glycidyl methacrylate, glycidyl acrylate, glycidyl benzoate, glycidyl acetate, glycidyl octanoate, glycidyl sorbate, glycidyl allyl phthalate, phenyl-(p-octadecyloxybenzoyl) ethylene oxide,

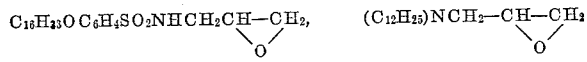

and the like. The preferred monoepoxides are the monoepoxide-substituted hydrocarbons, the monoepoxy-substituted ethers, sulfides, sulfones and esters wherein the compounds contain no more than eighteen carbon atoms, preferably up to six carbon atoms.

In preparing the novel resins of the invention, the polycarboxylic compounds are reacted with the polyhydric alcohols in a ratio to provide more than one hydroxyl group for each carboxyl group. The reaction of the polycarboxylic compounds and polyhydric alcohol components are continued until a resin is produced having an acid number in the range of 20 to about 90, preferably about 25 to about 60. At this point, the epoxide is introduced and the reaction is continued until the resin has an acid number in the range desired for the particular application involved. Generally, for the polyurethane foams the desired final acid number is less than 20, preferably less than about 10, and still more preferably less than about 2. The preferred reaction temperature is in the range from 150 to 200 degrees centigrade, but higher and lower temperatures can be used, for example, from 125 to 225 degrees centigrade. The hydroxyl number of the resulting resin generally falls in the range from about 200 to 800, usually from about 300 to 600. The viscosity of the resin is usually in the range up to 20 Gardner seconds at 120 degrees centigrade, generally from 100 Gardner seconds at 50 degrees centigrade to 15 Gardner seconds at 120 degrees centigrade, often about 1 to 15 Gardner seconds at 120 degrees centigrade, depending on the reactants and reaction conditions employed.

When the resins of the invention are used to produce polyurethane compositions various organic polyisocyanates can be used. Of the hydrocarbon polyisocyanates, the aryl and alkaryl polyisocyanates of the benzene and naphthalene series are more reactive and less toxic than the aliphatic members. Consequently, the aromatic compounds are preferred in the present invention. One preferred group of isocyanates are 2,4-tolylene diisocyanate; 2,6-tolylene diisocyanate and mixtures thereof, and particularly the complex mixtures that are commercially available. However, others can be used, among them phenyl isocyanate; alpha-naphthyl isocyanate; 4-tolylene isocyanate; n-hexyl isocyanate; methylene-bis(4-phenyl isocyanate); 3,3'-bitolylene-4,4'-diisocyanate; 3,3'-dimethoxy-4,4'-biphenylene diisocyanate; 1,5-naphthalene diisocyanate; 2,4-chlorophenyl diisocyanate; hexamethylene diisocyanate; ethylene diisocyanate; trimethylene diisocyanate; tetramethylene diisocyanate; pentamethylene diisocyanate; decamethylene diisocyanate; 1,3-cyclopentylene diisocyanate; 1,2-cyclohexylene diisocyanate; 1,4-cyclohexylene diisocyanate; cyclopentylidene diisocyanate; cyclohexylidene diisocyanate; p-phenylene diisocyanate; m-phenylene diisocyanate; 4,4'-diphenyl propane diisocyanate; 4,4'-diphenyl methane diisocyanate; 1-methyl-2,4-phenylene diisocyanate; 4,4'-diphenylene diisocyanate; 1,2-propylene diisocyanate; 1,2-butylene diisocyanate; 2,3-butylene diisocyanate; 1,3-butylene diisocyanate; ethylidene diisocyanate; propylidene diisocyanate; butylidene diisocyanate; 1,3,5-benzene triisocyanate; 2,4,6-tolylene triisocyanate; 2,4,6-monochlorobenzene triisocyanate; 4,4',4''-triphenylmethane triisocyanate; and 2,4,4'-diphenyl triisocyanate and mixtures thereof. Higher isocyanates are provided by the liquid reaction products of (1) diisocyanates and (2) polyols or polyamines; etc. In addition, isothiocyanates and mixtures of isocyanates may be employed. Also contemplated are the many impure or crude polyisocyanates that are commercially available.

It is also within the scope of this invention to produce polyurethane compositions by reacting the resins with prepolymer compositions comprising the isocyanato-terminated, resinous reaction products of an organic polyisocyanate with an active hydrogen-containing material selected from the group consisting of (1) carboxylic compounds having carboxyl numbers from 30 to 950, (2) polyhydric alcohols having hydroxyl numbers from 30 to 950, (3) hydroxyl-containing polymeric materials having a hydroxyl number between 30 and 950 and selected from the group consisting of (a) a polyester comprising the reaction product of a polyhydric alcohol and a polycarboxylic compound, (b) a polyether comprising the reaction product of a monoepoxide and a compound selected from the group consisting of a polyhydric alcohol, a polyphenolic compound, and a polycarboxylic acid, and (c) mixtures thereof, and (4) mixtures thereof. By active hydrogen-containing material is meant a compound containing an "active hydrogen atom," which refers to hydrogens which display activity according to the well-known Zerewitinoff method as described by Kohlen in JACS, 49, 3181 (1927). The polycarboxylic compounds and polyhydric alcohols which can be employed in preparing the isocyanato-terminated prepolymers are any of the polycarboxylic compounds and polyhydric alcohols described hereinbefore, as well as the acid chlorides and acid esters corresponding to the disclosed acids, i.e., phthaloyl chloride and the dimethyl ester of phthalic acid. The polyesters that can be employed as the hydroxyl-containing polymeric materials are well known in the art. Suitable polyesters are the reaction products of the polyhydric alcohols and polycarboxylic compounds listed hereinbefore, and include polycarboxylic acid chlorides and polycarboxylic acid esters. The polyhydric alcohols, polycarboxylic acids and epoxides that can be employed in preparing the polyethers for use as the hydroxyl-containing polymeric materials are any of the polyhydric alcohols, polycarboxylic acids or epoxides listed hereinbefore. The preferred epoxides are the monoepoxides, substituted-hydrocarbons, the monoepoxy-substituted ethers, sulfides, sulfones, and esters wherein said compounds contain no more than eighteen carbon atoms. Suitable polyphenolic compounds which can be employed in producing the polyethers are the reaction products of phenolic compounds with aldehydes such as phenol-formaldehyde novolac resins, bisphenols, and the like. In the preparation of these prepolymers, an organic polyisocyanate is reacted with the active hydrogen-containing material in an amount to provide at least about 200 percent of isocyanato groups with respect to the total number of hydroxyl and carboxyl groups in the active hydrogen-containing material. The upper limit on the ratio of isocyanato groups to hydroxyl and carboxyl groups is governed by the results desired, but would not generally exceed about 1500 percent. The temperature for preparing the prepolymers can vary considerably, they generally fall in the range from about 20 to 120 degrees centigrade.

The preferred active hydrogen-containing materials used in preparing the prepolymers are the resins of this invention. The following resin formulations are typical of other hydroxyl-containing polymeric materials that can be used in the practice of this invention, in the preparation of prepolymers, as well as in admixture with the halogenated resin product of the invention for preparation of final polyurethane products.

RESIN A 6 moles 1,4,5,6,7,7-hexachlorobicyclo-(2.2.1)-5-heptene-2,3-dicarboxylic acid
12 moles trimethylolpropane
Acid number: less than 10
Hydroxyl number: 365

RESIN B
6 moles adipic acid
10 moles trimethylolpropane
Acid number: less than 1
Hydroxyl number: 500

RESIN C
5 moles phenol
4 moles formaldehyde
1.25 moles ethylene oxide per phenolic hydroxide group
Hydroxyl number: 325

RESIN D
3 moles phenol
2 moles formaldehyde
2.5 moles ethylene oxide per phenolic hydroxide group
Hydroxyl number: 270

RESIN E
Polypropylene glycol
Molecular weight about 2000
Hydroxyl number: 56

RESIN F
4 moles 1,4,5,6,7,7-hexachlorobicyclo-(2.2.1)-5-heptene-2,3-dicarboxylic acid
7.6 moles glycerol
2 moles adipic acid
Acid number: 5
Hydroxyl number: 265

RESIN G
3 moles adipic acid
5 moles glycerol
Acid number: 1
Hydroxyl number: 640

RESIN H
1 mole trimethylolpropane
6 moles propylene oxide
Hydroxyl number: 392

Particularly suitable prepolymer compositions for use in this invention can be prepared in accordance with the method disclosed and claimed in copending application Ser. No. 114,042, filed June 1, 1961, now Patent No. 3,245,922. In accordance with the copending application, there is provided a novel reaction product of (A) a phosphorus compound having a formula selected from the group consisting of

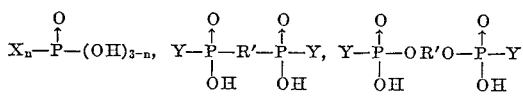

wherein $n$ is a whole number from one to two, X is independently selected from the group consisting of R and RO, and Y is independently selected from the group consisting of R, RO and OH, wherein R is selected from the group consisting of alkyl, cycloalkyl, aralkyl and aryl radicals having one to seven carbon atoms, R′ is an alkylene group having one to seven carbon atoms; (B) an epoxide and (C) an organic polyisocyanate wherein the epoxide and acid groups are reacted in the ratio of substantially one epoxide group per acid group. This novel phosphorus-containing product can be reacted directly with the novel alkyd resins of the present invention to produce the desired polyurethane product. Alternatively, the phosphorus-containing product can be used to prepare a prepolymer composition by reacting said phosphorus-containing product with an active hydrogen-containing material of the type described hereinbefore. The resin product of this invention is well suited for use as the active hydrogen-containing material. The resulting prepolymer compositions can be reacted with the novel alkyd resins of the present invention to produce polyurethane compositions having an extremely high degree of fire resistance and many other exceptional properties.

Reaction catalysts can be used in producing the polyurethane compositions. The catalyst employed can be any of the known conventional catalysts for isocyanate reactions, such as tertiary amines, for example, triethylamine, N-methyl morpholine, triethanolamine, N,N,N′,N′-tetramethylbutanediamine-1,3, and the like, or antimony compounds such as antimony caprylate, antimony naphthenate or antimonous chloride. In addition, tin compounds can be employed, for example, dibutyltin dilaurate, tri-n-octyltin oxide, hexabutylditin, tributyltin phosphate or stannic chloride.

Rigid or flexible polyurethane foams can be produced. The rigid polyurethane foams utilize a highly branched hydroxyl rich polyester or polyether having a hydroxyl number of between about 200 and 950. The flexible polyurethane foams utilize a linear relatively hydroxyl poor polyester or polyether having a hydroxyl number of between about 30 and 100. If a polyester or polyether with a hydroxyl number between about 100 and 200 is employed, a semi-rigid polyurethane foam is usually obtained.

When the polyurethane compositions of the invention are foamed, any foaming agent commonly used in the polyurethane art can be employed. Foaming agents in this art are generally those materials that are capable of liberating gaseous products when heated or when reacted with an isocyanate. Preferably, foaming is accomplished by introducing a low boiling liquid into the catalyzed resin. The heat of reaction is then sufficient to expand the mixture to a foam stable enough to retain its shape until the resin gels. Suitable liquids are the fluorochlorocarbons boiling in the range of −30 to 50 degrees centigrade, and mixtures thereof, for example, trichlorofluoromethane, trichlorotrifluoroethane, dichloromonofluoromethane, monochloroethane, monochloromonofluoroethane, difluoromonochloroethane, and difluorodichloroethane.

Another foaming system that is suitable for carrying out the foaming reaction at an elevated temperature is found in United States Patent 2,865,869, which discloses and claims the use of tertiary alcohols in the presence of strong, concentrated acid catalysts. Examples of tertiary alcohols include: tertiary amyl alcohol; tertiary butyl alcohol; 2 - methyl - 3 - butyn-2-ol; 1-methyl-1-phenylethanol; 1,1,2,2-tetraphenylethanol, and the like. Examples of catalysts include: sulfuric acid; phosphoric acid; sulfonic acid; aluminum chloride, and the like. In addition, various secondary alcohols and glycols can be used such as: 1-phenyl-1,2-ethanediol; 2-butanol, and the like. Generally, secondary alcohols should be used with strong, concentrated acid catalysts as above; however, certain secondary alcohols can be used without the acid catalyst, e.g., acetaldol, chloral hydrate, and the like. Other foaming agents that can be used include the following: polycarboxylic acids, polycarboxylic acid anhydrides, dimethylol ureas, polymethylol phenols, formic acid and tetrahydroxy methylphosphonium chloride. In addition, mixtures of the above foaming agents can be employed.

Emulsifiers such as silicone-glycol copolymers can be used in the preparation of the polyurethanes.

In preparing the polyurethane compositions, the components are preferably reacted in a ratio sufficient to provide about 85 to 115 percent of isocyanato groups with respect to the total number of hydroxyl, carboxyl and equivalent groups present in the hydroxyl-containing polymeric materials (and the foaming agent, if one is provided). By equivalent groups is meant other isocyanate-reactive groups such as anhydride, acid halide, and the like. The reaction temperature generally ranges from about 20 to about 120 degrees centigrade, although higher and lower temperatures can be used.

The invention is illustrated by the following specific examples, but is not intended to be limited thereby. Temperatures are in degrees centigrade and parts are by weight unless otherwise indicated.

The first three examples show the results the use of the invention has on reducing the reaction time required to achieve a low acid number alkyd resin as well as the marked effect on the final viscosity of the resin.

Example 1

Twelve moles of trimethylol propane and six moles of 1,4,5,6,7,7 - hexachlorobicyclo - (2.2.1) - 5 - heptene-2,3-dicarboxylic acid are reacted at 160 degrees centigrade. After twenty-four hours reaction time, the acid number of the resin has only been reduced to eight. The hydroxyl number of the resin is 360 and the viscosity is 70 Gardner seconds at 120 degrees centigrade. Continuing the reaction until the acid number of the resin is less than one, results in further increasing the viscosity of the resin.

Example 2

Twelve moles of trimethylol propane and six moles of 1,4,5,6,7,7 - hexachlorobicyclo - (2.2.1) - 5 - heptene-2,3-dicarboxylic acid are reacted until an acid number of 25 is achieved. Then gaseous propylene oxide is introduced to the reaction mixture in a nitrogen carrier gas until the acid number is reduced to less than one. Consumption of propylene oxide is four moles. Total reaction time is sixteen hours. Final hydroxyl number is 366 and the viscosity is 11 Gardner seconds at 120 degrees centigrade.

Example 3

Twelve moles of trimethylol propane are reacted with six moles of 1,4,5,6,7,7 - hexachlorobicyclo - (2.2.1) - 5-heptene-2,3-dicarboxylic acid until an acid number of 50 is achieved, at which time the introduction of propylene oxide to the reaction mixture is begun. Final hydroxyl number of the resin is 395, acid number is one and the viscosity is 5 Gardner seconds at 120 degrees centigrade.

The foregoing examples are repeated using fourteen moles of trimethylol propane and six moles of 1,4,5,6,7,7-hexachlorobicyclo-(2.2.1)-5-heptene-2,3-dicarboxylic acid to produce resins with acid numbers of about one or less and with the following additional properties.

| Example | Propylene Oxide Added at Acid Number | Final Hydroxyl Number | Final Viscosity Gardner Seconds at 120 Degrees Centigrade |
| --- | --- | --- | --- |
| 4 | None | 421 | 35 |
| 5 | 25 | 417 | 6 |
| 6 | 50 | 418 | 4 |

The foregoing examples show that the resin products of the invention produced with a monoepoxide component, have a lower viscosity than the corresponding resinous polyester that is not modified by a monoepoxide component, but which has the same acid and alcohol components employed in the same ratio as in the products of the invention.

Results that are similar to those obtained in the foregoing examples are obtained using other carboxylic adducts of hexahalocyclopentadiene as follows:

Example:         Adduct of hexahalocyclopentadiene
7 _____ 1,4,5,6,7,7 - hexaclorobicyclo - (2.2.1)-5-heptene-2,3-dicarboxylic anhydride.
8 _____ 1,4,5,6,7,7 - hexabromobicyclo - (2.2.1)-5-heptene-2,3-dicarboxylic anhydride.
9 _____ 1,4,5,6 - tetrachloro - 7,7-difluorobicyclo-(2.2.1)-5-heptene-2,3-dicarboxylic acid.

The following examples show the use of the alcohol adduct of hexahalocyclopentadiene in the invention.

Example 10

A resin is prepared by reacting 361 parts of 2,3-dimethylol-1,4,5,6,7,7 - hexachlorobicyclo - (2.2.1)-5-heptene and 192 parts of trimellitic anhydride at 120 degrees centigrade in the presence of 0.5 part of sodium acetate catalyst. 1000 parts of toluene are used as a diluent for the reaction mixture. After one-half hour, the introduction of propylene oxide is commenced and heating is continued at 120 degrees centigrade until an acid number of nearly zero is achieved. The diluent is stripped under vacuum at 150 degrees centigrade, leaving the resin product.

Example 11

A resin is prepared by mixing 361 parts of 2,3-dimethylol-1,4,5,6,7,7 - hexachlorobicyclo - (2.2.1)-5-heptene, 92 parts of glycerol, 740 parts of phthalic anhydride, 1000 parts of toluene and heating the mixture at 150 degrees centigrade. After one-half hour, propylene oxide is introduced and the reaction is continued until the acid number of the resin approaches zero. Stripping of the diluent leaves the resin product.

The following examples show the use of additional trihydric alcohols in the invention.

Example 12

Twelve moles of glycerol are reacted with six moles of 1,4,5,6,7,7 - hexachlorobicyclo - (2.2.1)-5-heptene-2,3-dicarboxylic anhydride until an acid number of fifty is achieved, at which time the introduction of propylene oxide to the reaction mixture is commenced. The reaction is continued until the acid number of the resin drops to about one.

Using the method employed in Example 12, additional alkyd resins are produced in accordance with the invention using other polyhydric alcohols containing at least three hydroxyl groups as shown in the following examples:

Example:         Polyhydric alcohol
13 _____ 1,2,6-hexanetriol.
14 _____ Trihydroxypropyl glycerol.

Example 15

Using the method of Example 2, the reaction product of twelve moles of trimethylol propane and six moles of 1,4,5,6,7,7 - hexachlorobicyclo - (2.2.1)-5-heptene-2,3-dicarboxylic acid is reacted with ethylene oxide to produce a resin having a viscosity of seven Gardner seconds at 120 degrees centigrade.

Using the method of Example 15, low viscosity resins are produced using different epoxides as follows:

Example:         Epoxide
16 _____ Butylene oxide.
17 _____ Cyclohexene oxide.
18 _____ Glycidol.

The following examples demonstrate the use of the resins of the invention in polyurethane compositions.

Example 19

A phosphorus-containing urethane composition is produced as follows. To 690 parts of a commercial mixture of 80 percent 2,4-tolylene diisocyanate and 20 percent of 2,6-tolylene diisocyanate are added 170 parts of 3,4-epoxy - 6 - methylcyclohexylmethyl - 3,4 - epoxy - 6-methylcyclohexane carboxylate at ambient temperature. To this mixture are added dropwise and with vigorous stirring 140 parts of a commercial mixture comprising approximately fifty mole percent butyl monoacid phosphate and fifty mole percent butyl diacid phosphate. The temperature is maintained below 40 degrees centigrade with a cold water bath. One-half hour after the addition of the acid phosphate, the temperature is raised to 80 degrees centigrade for one-half hour.

One hundred parts of the resin produced in Example 2 in accordance with the invention are mixed with 0.5 part of a silicone-glycol copolymer emulsifier and 0.8 part of N,N,N',N'-tetramethylbutanediamine-1,3. To this mixture are added with rapid stirring 100 parts of the phosphorus-containing urethane composition described in the preceding paragraph. A sample of the resulting polyurethane composition is placed between two aluminum plates. The assembly is held together with a C-clamp for two hours at about 30 degrees centigrade. The resulting bond has good strength, indicating the polyurethane composition to have good adherence to the metal surfaces.

*Example 20*

To a mixture of 100 parts of the resin produced in Example 2, 0.5 part of a silicone-glycol copolymer emulsifier and 0.8 part of N,N,N',N'-tetramethylbutanediamine-1,3 are added with rapid stirring a solution of 100 parts of the phosphorus-containing urethane composition described in the preceding example and 40 parts of trichlorofluoromethane. Foaming of the composition begins in about 40 seconds. The resulting foam is cured for ten minutes at 80 degrees centigrade, to produce a fire-retardant foam product having a fine cell structure and a density of about two pounds per cubic foot.

*Example 21*

A prepolymer composition is produced as follows. 350 parts of a commercial mixture of 80 percent 2,4-tolylene diisocyanate and 20 percent 2,6-tolylene diisocyanate and 35 parts of propylene oxide are charged into a reaction vessel. To this mixture, a blend of 45 parts of methyl acid phosphate and 55 parts of the resin produced in accordance with Example 2 is added dropwise with rapid stirring at a temperature of about 50 degrees centigrade. The components pass into solution immediately and the reaction is exothermic.

Fifty parts of the resin produced in Example 2 in accordance with the invention and 50 parts of Resin D disclosed hereinbefore are mixed with 0.5 part of silicone-glycol copolymer emulsifier and one part of N,N,N',N'-tetramethylbutanediamine-1,3. To this solution are added with rapid stirring 100 parts of the prepolymer described in the preceding paragraph. The resulting polyurethane composition is applied to the surface of an aluminum sheet and forms a durable coating that is highly flame-resistant and water-resistant.

As shown in the preceding example, additional hydroxyl-containing polymeric materials can be blended with the resin of the invention prior to forming the polyurethane composition. Any of the hydroxyl-containing polymeric materials described hereinbefore are suitable for this purpose.

*Example 22*

A polyurethane foam is produced as follows. Fifty parts of the resin produced in accordance with Example 2, and 50 parts of Resin D are mixed with 0.5 part of silicone-glycol copolymer emulsifier and one part of N,N,N',N'-tetramethylbutanediamine-1,3. To this solution are added a mixture of 100 parts of the prepolymer described in the preceding example and 30 parts of trichlorofluoromethane. Thirty seconds after the components are blended, the liquid blend is poured into a mold and permitted to expand at about 30 degrees centigrade. The resulting foam is cured at 80 degrees centigrade for ten minutes to produce a finished product having a fine cell structure, a density of about two pounds per cubic foot and a high degree of fire resistance.

*Example 23*

A prepolymer is prepared by reacting 35 parts of Resin B with 100 parts of tolylene diisocyanate. 100 parts of this prepolymer are mixed with 30 parts of trichlorofluoromethane and then reacted with 100 parts of the resin produced in Example 2 in accordance with the invention. The blend is mixed with 0.5 part of silicone-glycol copolymer emulsifier and one part of N,N,N',N'-tetramethylbutanediamine-1,3. The liquid blend is poured into a mold and permitted to expand at about 30 degrees centigrade. The resulting foam is cured at 80 degrees centigrade to produce a foam product having a fine cell structure and a high degree of fire resistance.

In the following examples, additional low density fire-resistant foam products are produced in accordance with the method of Example 23, using prepolymer compositions having the indicated components.

| Example | Active Hydrogen-Containing Material | Isocyanate |
|---|---|---|
| 24 | Resin B | Tolylene diisocyanate. |
| 25 | Resin C | Do. |
| 26 | Resin E | 50 percent methylene-bis-(4-phenylisocyanate) and 50 percent tolylene diisocyanate. |
| 27 | Resin G | Do. |
| 28 | 1,4,5,6,7,7-hexachloro-bicyclo (2.2.1)-5-heptene-2,3-dicarboxylic acid. | Tolylene diisocyanate. |
| 29 | 5,6-bis(hydroxymethyl)-1,2,3,4,7,7-hexachloro-bicyclo-(2.2.1)-heptene-2. | Do. |

*Example 30*

A foam is produced using the resin prepared in accordance with Example 10. 40 grams of this resin are mixed with 10 grams of glycerol and 47 grams of tolylene diisocyanate. To this mixture is added a solution of six drops of concentrated sulfuric acid and five cubic centimeters of tertiary amyl alcohol. The resulting mixture is poured into a mold and thereafter expanded and cured for 30 minutes at 80 degrees centigrade. The product is a low density foam having a fine cell structure.

*Example 31*

Following the procedure of Example 30, a foam is produced using the resin prepared in accordance with Example 11.

*Example 32*

100 parts of the resin produced in accordance with Example 2 are blended with 2 parts of water, 2 parts of eight percent phosphoric acid and 0.5 part of silicone-glycol copolymer emulsifier. To this mixture at 40 degrees centigrade, 107 parts of a commercial mixture of tolylene diisocyanates are added with rapid stirring. The foam is permitted to expand at room temperature and is then cured at 120 degrees centigrade for ten minutes. The foam produced is fire retardant and can be cycled to 160 degrees centigrade without distortion.

The following example illustrates the preparation of an isocyanato-terminated resinous product.

*Example 33*

Twenty parts by weight of the resin produced in Example 2, and 80 parts of tolylene diisocyanate are heated at 100 degrees centigrade for one-half hour. The resulting isocyanato-terminated resinous product is useful for reaction with a hydroxyl-containing polymer to produce a final polyurethane composition.

While this invention has been described with reference to certain specific embodiments, it will be recognized by those skilled in the art that many variations are possible without departing from the spirit and scope of the invention.

We claim:
1. A fire-resistant polyurethane product of components comprising an organic polyisocyanate and a resinous reaction product, said resinous reaction product having an acid number of less than 20, and being the reaction product of components comprising a monomeric 1,2-epoxide and a resinous polyester having an acid number in the range from 20 to about 90 and selected from the group consisting of (1) the resinous polyester of components comprising (a) an adduct of hexahalocyclopentadiene and a polycarboxylic compound containing aliphatic carbon-to-carbon unsaturation and (b) a polyhydric alcohol containing at least three hydroxyl groups, (2) the resinous polyester of components comprising (a) an adduct of hexahalocyclopentadiene and a polyhydric alcohol containing aliphatic carbon-to-carbon unsaturation, (b) a polyhydric alchool containing at least three hydroxyl groups and (c) a dicarboxylic compound, (3) the resinous polyester of components comprising (a) an adduct of hexahalocyclopentadiene and a polyhydric alcohol containing aliphatic carbon-to-carbon unsaturation and (b) a polycarboxylic compound containing at least three carboxyl groups, and (4) mixtures thereof, wherein the halo-substituent is selected from the group consisting of fluorine, chlorine, bromine, and mixtures thereof, and wherein the carboxylic compounds are selected from the group consisting of a carboxylic acid, a carboxylic acid anhydride, and mixtures thereof; said resinous reaction product of said acid number of less than 20, by virtue of its monoepoxide component, having a viscosity as measured in Gardner seconds at 120 degrees centigrade that is lower than the viscosity as measured in Gardner seconds at 120 degrees centigrade of the corresponding resinous polyester that is unmodified by a monoepoxide component, but which has the same carboxylic and polyhydric alcohol components employed in the same ratio and has the same acid number of less than 20.

2. A fire-resistant cellular reaction product of components comprising an organic polyisocyanate, a foaming agent, and a resinous reaction product, said resinous reaction product having an acid number of less than 20, and being the reaction product of components comprising a monomeric 1,2-epoxide and a resinous polyester having an acid number in the range from 20 to about 90 and selected from the group consisting of (1) the resinous polyester of components comprising (a) an adduct of hexahalocyclopentadiene and a polycarboxylic compound containing aliphatic carbon-to-carbon unsaturation and (b) a polyhydric alcohol containing at least three hydroxyl groups, (2) the resinous polyester of components comprising (a) an adduct of hexahalocyclopentadiene and a polyhydric alcohol containing aliphatic carbon-to-carbon unsaturation, (b) a polyhydric alcohol containing at least three hydroxyl groups and (c) a dicarboxylic compound, (3) the resinous polyester of components comprising (a) an adduct of hexahalocyclopentadiene and a polyhydric alcohol containing aliphatic carbon-to-carbon unsaturation and (b) a polycarboxylic compound containing at least three carboxyl groups, and (4) mixtures thereof, wherein the halo-substituent is selected from the group consisting of fluorine, chlorine, bromine, and mixtures thereof, and wherein the carboxylic compounds are selected from the group consisting of a carboxylic acid, a carboxylic acid anhydride, and mixtures thereof; said resinous reaction product of said acid number of less than 20, by virtue of its monoepoxide component, having a viscosity as measured in Gardner seconds at 120 degrees centigrade that is lower than the viscosity as measured in Gardner seconds at 120 degrees centigrade of the corresponding resinous polyester that is unmodified by a monoepoxide component, but which has the same carboxylic and polyhydric alcohol components employed in the same ratio and has the same acid number of less than 20; wherein the polyisocyanate is present in an amount to provide about 85 to 115 percent of isocyanato groups with respect to the total number of hydroxyl, carboxyl and equivalent groups present in the hydroxyl-containing components.

3. A fire-resistant cellular reaction product of components comprising an organic polyisocyanate, a foaming agent, and a resinous reaction product, said resinous reaction product having an acid number of less than 20, and being the reaction product of components comprising a monomeric 1,2-epoxide and a resinous polyester, having an acid number in the range from 20 to about 90, of components comprising (a) an adduct of hexahalocyclopentadiene and a polycarboxylic compound containing aliphatic carbon-to-carbon unsaturation and (b) a polyhydric alcohol containing at least three hydroxyl groups, wherein the halo-substituent is selected from the group consisting of fluorine, chlorine, bromine, and mixtures thereof, and wherein the polycarboxylic compound is selected from the group consisting of a polycarboxylic acid, a polycarboxylic acid anhydride, and mixtures thereof; said resinous reaction product of said acid number of less than 20, by virtue of its monoepoxide component, having a viscosity as measured in Gardner seconds at 120 degrees centigrade that is lower than the viscosity as measured in Gardner seconds at 120 degrees centigrade of the corresponding resinous polyester that is unmodified by a monoepoxide component, but which has the same carboxylic and polyhydric alcohol components employed in the same ratio and has the same acid number of less than 20, wherein the polyisocyanate is present in an amount to provide about 85 to 115 percent of isocyanato groups with respect to the total number of hydroxyl, carboxyl and equivalent groups present in the hydroxyl-containing components.

4. A fire-resistant cellular reaction product of components comprising an organic polyisocyanate, a foaming agent, and a resinous reaction product, said resinous reaction product having an acid number of less than about 10 and a hydroxyl number in the range from about 200 to 800, and being the reaction product of components comprising a monomeric 1,2-epoxide and a resinous polyester having an acid number in the range from about 25 to about 60, of components comprising (a) an adduct of hexahalocyclopentadiene and a polycarboxylic compound containing aliphatic carbon-to-carbon unsaturation and (b) a polyhydric alcohol containing at least three hydroxyl groups, wherein the halo-substituent is selected from the group consisting of fluorine, chlorine, bromine, and mixtures thereof, and wherein said polycarboxylic compound is selected from the group consisting of a polycarboxylic acid, a polycarboxylic acid anhydride, and mixtures thereof, said resinous reaction product of said acid number of less than about 10, by virtue of its monoepoxide component, having a viscosity as measured in Gardner seconds at 120 degrees centigrade that is lower than the viscosity as measured in Gardner seconds at 120 degrees centigrade of the corresponding resinous polyester that is unmodified by a monoepoxide component, but which has the same carboxylic and polyhydric alcohol components employed in the same ratio and has the same acid number of less than about 10; wherein the polyisocyanate is present in an amount to provide about 85 to 115 percent of isocyanato groups with respect to the total number of hydroxyl, carboxyl and equivalent groups present in the hydroxyl-containing components.

5. The product of claim 4 wherein the adduct of hexahalocyclopentadiene is 1,4,5,6,7,7 - hexachlorobicyclo-(2.2.1)-5-heptene-2,3-dicarboxylic acid.

6. The product of claim 4 wherein the adduct of hexahalocyclopentadiene is 1,4,5,6,7,7 - hexachlorobicyclo-(2.2.1)-5-heptene-2,3-dicarboxylic anhydride.

7. The product of claim 5 wherein the polyhydric alcohol is trimethylol propane.

8. The product of claim 6 wherein the polyhydric alcohol is trimethylol propane.

9. The product of claim 7 wherein the 1,2-epoxide is propylene oxide.

10. The product of claim 8 wherein the 1,2-epoxide is propylene oxide.

11. The product of claim 2 having reacted therein an additional hydroxyl-containing polymeric material having a hydroxyl number between 30 and 950 and selected from the group consisting of (a) a polyester comprising the reaction product of a polyhydric alcohol and a polycarboxylic compound, (b) a polyether comprising the reaction product of a monoepoxide and a compound selected from the group consisting of a polyhydric alcohol, a polyphenolic compound, and a polycarboxylic acid, and (c) mixtures thereof.

12. The product of claim 4 having reacted therein an additional hydroxyl-containing polymeric material having a hydroxyl number between 30 and 950 and selected from the group consisting of (a) a polyester comprising the reaction product of a polyhydric alcohol and a polycarboxylic compound, (b) a polyether comprising the reaction product of a monoepoxide and a compound selected from the group consisting of a polyhydric alcohol, a polyphenolic compound, and a polycarboxylic acid, and (c) mixtures thereof.

13. An isocyanato-terminated resinous product of components comprising an organic polyisocyanate and a hydroxyl-terminated resinous reaction product, said resinous reaction product having an acid number of less than 20, and being the reaction product of components comprising a monomeric 1,2-epoxide and a resinous polyester having an acid number in the range from 20 to about 90 and selected from the group consisting of (1) the resinous polyester of components comprising (a) an adduct of hexahalocyclopentadiene and a polycarboxylic compound containing aliphatic carbon-to-carbon unsaturation and (b) a polyhydric alcohol containing at least three hydroxyl groups, (2) the resinous polyester of components comprising (a) an adduct of hexahalocyclopentadiene and a polyhydric alcohol containing aliphatic carbon-to-carbon unsaturation, (b) a polyhydric alcohol containing at least three hydroxyl groups and (c) a dicarboxylic compound, (3) the resinous polyester of components comprising (a) an adduct of hexahalocyclopentadiene and a polyhydric alcohol containing aliphatic carbon-to-carbon unsaturation and (b) a polycarboxylic compound containing at least three carboxyl groups, and (4) mixtures thereof, wherein the halo-substituent is selected from the group consisting of fluorine, chlorine, bromine, and mixtures thereof, and wherein the carboxylic compounds are selected from the group consisting of a carboxylic acid, a carboxylic acid anhydride, and mixtures thereof; said resinous reaction product of said acid number of less than 20, by virtue of its monoepoxide component, having a viscosity as measured in Gardner seconds at 120 degrees centigrade that is lower than the viscosity as measured in Gardner seconds at 120 degrees centigrade of the corresponding resinous polyester that is unmodified by a monoepoxide component, but which has the same carboxylic and polyhydric alcohol components employed in the same ratio and has the same acid number of less than 20; wherein said polyisocyanate is present in an amount sufficient to provide at least about 200 percent of isocyanato groups with respect to the total number of hydroxyl and carboxyl groups in the hydroxyl-terminated resinous product.

14. A process for preparing a fire-resistant polyurethane composition which comprises reacting an organic polyisocyanate with a resinous reaction product, said resinous reaction product having an acid number of less than 20, and being the reaction product of components comprising a monomeric 1,2-epoxide and a resinous polyester having an acid number in the range from 20 to about 90 and selected from the group consisting of (1) the resinous polyester of components comprising (a) an adduct of hexahalocyclopentadiene and a polycarboxylic compound containing aliphatic carbon-to-carbon unsaturation and (b) a polyhydric alcohol containing at least three hydroxyl groups, (2) the resinous polyester of components comprising (a) an adduct of hexahalocyclopentadiene and a polyhydric alcohol containing aliphatic carbon-to-carbon unsaturation, (b) a polyhydric alcohol containing at least three hydroxyl groups and (c) a dicarboxylic compound, (3) the resinous polyester of components comprising (a) an adduct of hexahalocyclopentadiene and a polyhydric alcohol containing aliphatic carbon-to-carbon unsaturation and (b) a polycarboxylic compound containing at least three carboxyl groups, and (4) mixtures thereof, wherein the halo-substituent is selected from the group consisting of fluorine, chlorine, bromine, and mixtures thereof, and wherein the carboxylic compounds are selected from the group consisting of a carboxylic acid, a carboxylic acid anhydride, and mixtures thereof; said resinous reaction product of said acid number of less than 20, by virtue of its monoepoxide component, having a viscosity as measured in Gardner seconds at 120 degrees centigrade that is lower than the viscosity as measured in Gardner seconds at 120 degrees centigrade of the corresponding resinous polyester that is unmodified by a monoepoxide component, but which has the same carboxylic and polyhydric alcohol components employed in the same ratio and has the same acid number of less than 20.

15. A process for preparing a fire-resistant polyurethane foam which comprises reacting an organic polyisocyanate with a resinous reaction product, said resinous reaction product having an acid number of less than about 10 and a hydroxyl number in the range from about 200 to 800, and being the reaction product of components comprising a monomeric 1,2-epoxide and a resinous polyester having an acid number in the range from about 25 to about 60, of components comprising (a) an adduct of hexahalocyclopentadiene and a polycarboxylic compound containing aliphatic carbon-to-carbon unsaturation and (b) a polyhydric alcohol containing at least three hydroxyl groups, wherein the halo-substituent is selected from the group consisting of fluorine, chlorine, bromine, and mixtures thereof, and wherein said polycarboxylic compound is selected from the group consisting of a polycarboxylic acid, a polycarboxylic acid anhydride, and mixtures thereof; said resinous reaction product of said acid number of less than about 10, by virtue of its monoepoxide component, having a viscosity as measured in Gardner seconds at 120 degrees centigrade that is lower than the viscosity as measured in Gardner seconds at 120 degrees centigrade of the corresponding resinous polyester that is unmodified by a monoepoxide component, but which has the same carboxylic and polyhydric alcohol components employed in the same ratio and has the same acid number of less than about 10, in the presence of a foaming agent; wherein the polyisocyanate is present in an amount to provide about 85 to 115 percent of isocyanato groups with respect to the total number of hydroxyl, carboxyl and equivalent groups present in the hydroxyl-containing components.

16. The process of claim 15 wherein the adduct of hexahalocyclopentadiene is 1,4,5,6,7,7-hexachlorobicyclo-(2.2.1)-5-heptene-2,3-dicarboxylic acid.

17. The process of claim 15 wherein the adduct of hexahalocyclopentadiene is 1,4,5,6,7,7-hexachlorobicyclo-(2.2.1)-5-heptene-2,3-dicarboxylic anhydride.

References Cited by the Examiner
UNITED STATES PATENTS

| | | | |
|---|---|---|---|
| 2,779,700 | 1/1957 | Robitschek et al. | 260—75 |
| 2,863,855 | 12/1958 | Wilson et al. | 260—75 |
| 3,089,863 | 5/1963 | Hicks et al. | 260—75 |
| 3,214,392 | 10/1965 | Worsley et al. | 260—2.5 |

FOREIGN PATENTS

| | | |
|---|---|---|
| 1,034,854 | 7/1958 | Germany. |

LEON J. BERCOVITZ, *Primary Examiner.*

J. J. KLOCKO, *Assistant Examiner.*